Patented Feb. 21, 1950

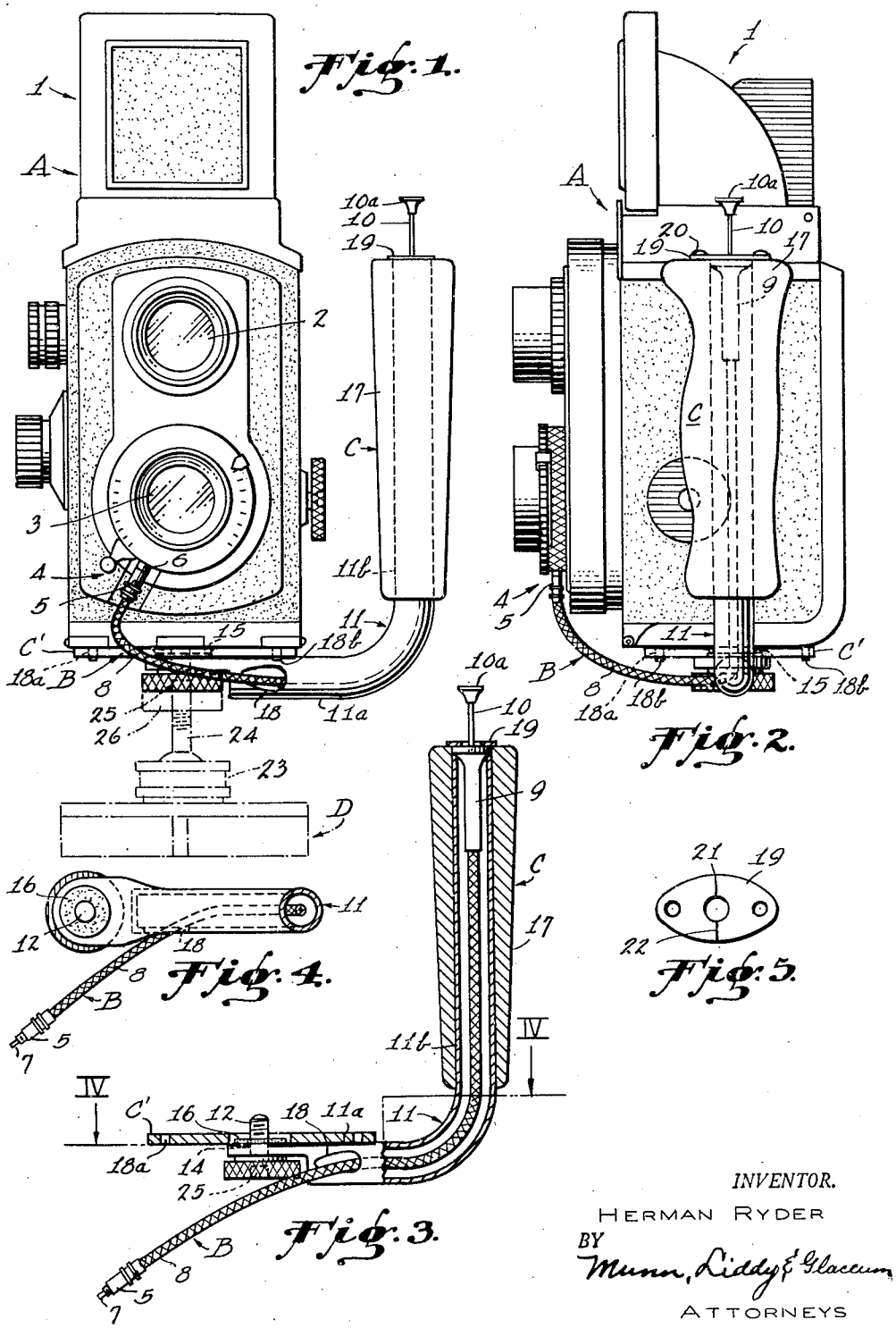

2,498,137

UNITED STATES PATENT OFFICE 2,498,137

COMBINED CAMERA SUPPORT AND SHUTTER RELEASE

Herman Ryder, Tacoma, Wash.

Application May 9, 1947, Serial No. 746,973

1 Claim. (Cl. 95—86)

The present invention relates to improvements in a combined camera support and shutter release. It consists of the combinations, constructions and arrangement of parts hereinafter described and claimed.

An object of my invention is to provide a combined camera support and shutter release, which will enable a person to operate or trip the shutter of a camera with the same hand that is being used to support and aim the camera. This eliminates the danger of holding and accidentally moving any delicate part of the camera while operating it, because the photographer's hand is not required on the camera body.

At the same time, the other hand of the photographer is entirely free to change film, adjust focus or range finder, adjust lens stops, set shutter speeds, or whatever is necessary to do on the camera. My device gives a greater and firmer hold on the camera for slow shutter speeds. It enables a person to carry a camera without holding any part of the camera.

A further object of my invention resides in the provision of a device of the character described that may be used on a camera mounted on a conventional tripod. The camera may be moved about the universal support of the tripod into various positions by merely manipulating the handle. When the photographer is ready to take a picture, the plunger of a cable release is immediately available on the handle for operating the shutter release mechanism of the camera.

The increase in speed which this device gives in operating a camera is indeed tremendous. Many cameras may be operated to get a series of pictures in rapid succession by actuating the film transport lever with one hand while the other hand is holding and aiming the camera with my combined handle or support and shutter release.

A still further object of my invention is to provide a combined camera handle and shutter release that is simple in construction, durable and efficient for the purpose intended.

Other objects and advantages will appear as the specification continues, and the novel features of my invention will be set forth in the appended claim.

For a better understanding of the invention, reference should be had to the accompanying drawing, forming part of this application, in which:

Figure 1 is a front elevation of a camera with my combined support and shutter release applied thereto, the tripod head and universal support of a conventional tripod being shown in dot-dash lines;

Figure 2 is a side elevation of Figure 1, as viewed from the right-hand side of the latter;

Figure 3 is a vertical sectional view taken through my device, parts being illustrated in elevation;

Figure 4 is a horizontal section taken along the line IV—IV of Figure 3; and

Figure 5 is a top plan view of a cable release retaining plate that I employ.

Referring to the drawings in detail, I have disclosed a reflex type of camera indicated generally at A. I do not desire to be limited to this particular camera and have shown it only by way of illustration. In its structural features, the camera A has a focusing hood 1 (shown in raised position), a viewing lens 2, a taking lens 3 and a shutter release 4.

A standard cable release B is provided with a threaded sleeve 5, which screws into a cable release socket 6. A push rod 7 extends through the flexible covering 8 in the usual manner. The outer end of this covering terminates in a release head 9 that has a reciprocating plunger 10 mounted therein. It will be understood, of course, that each time the plunger 10 is depressed, the push rod 7 will actuate the shutter release 4 for taking a picture.

The parts thus far described are conventional and form no part of the present invention, except insofar as they cooperate with the parts to be described below.

My handle is indicated generally at C. In the form shown, the handle includes a substantially L-shaped tube 11. An attaching bolt 12 passes through an opening 14 and is threaded into a tripod socket 15 provided on the underside of the camera. A suitable washer 16 may be interposed between the horizontal leg 11a of the tube and the tripod socket. The vertical leg 11b of the tube extends upwardly along one side of the camera and in spaced relation therewith, this leg having a hand grip 17 provided thereon. A fastening plate C' is secured to the tube 11 and fits against the bottom of the camera. This plate has four small holes 18a in it to receive the small studs 18b of the camera so that the plate will not swing out of place.

The grip 17 may be formed of any suitable material, for instance plastic moulded around the tube 11. I do not desire to be limited in this respect. The grip is shaped so that it may be grasped in one hand of the photographer, and the plunger 10 operated by the same hand. When the plunger extends above the handle, as shown in the drawing, the thumb may be used for depressing the plunger 10.

The cable release B is guided along the bore of the tube 11 and emerges through an opening 18 formed in the horizontal leg 11a (see Figures 1, 3 and 4). The projecting end of the cable release is sufficiently long to permit the sleeve 5 to be screwed into the cable release socket 6. The head 9 is rotatably disposed in the vertical leg 11b so as to permit the head and the cable release B to rotate when connecting the sleeve 5 to the socket 6 or disconnecting the sleeve from the latter. This arrangement prevents kinking of the cable release.

In order to hold the release head in place, I provide a retaining plate 19, which is secured to the top of the grip 17 by screws 20, or other suitable fastening means. The opening 21 in the plate 19 is smaller than the diameter of the button 10a on the plunger 10. Accordingly, I have split the plate at 22 so as to allow the plate to be positioned over the release head 9, or removed therefrom.

The handle C forms a support for the camera A, and the handle may be moved into various positions for aiming the camera. As soon as the photographer is ready to take a picture, the plunger is depressed, which results in operating the shutter release 4.

In Figure 1 of the drawing, I disclose a conventional tripod head D having a universal support 23 mounted thereon. The stem 24 rising from the universal support may be screwed into a threaded bore 25 formed in the head of the screw 12. A locking nut 26 is provided on the stem 24 for preventing the latter from disengaging itself from the threaded bore 25. When the camera is supported on the tripod head D, the handle C may be used for swinging the camera into the desired position for aiming the camera.

In certain types of heavy cameras, it may be necessary to provide a strut (not shown) between the top of the handle C and the camera A. Such an arrangement is obvious, and no disclosure thereof is considered necessary. The cable release B may emerge at any convenient place on the tube 11. Likewise, the plunger 10 may be located at any suitable point where it can be operated by the same hand of the photographer that is grasping the grip 17 of the handle.

Having thus described the various parts of my combined camera support and shutter release, the assembly and operation thereof is summarized briefly as follows:

The photographer applies the attaching plate C' against the camera so that the holes 18a will receive the studs 18b and then inserts the attaching bolt 12 through the opening 14 formed in the horizontal leg 11a, and screws the bolt into the tripod socket 15. This will position the leg 11b of the handle C in upright and spaced relation relative to one side of the camera A. In the event that the tripod head D is to be used, the stem 24 is threaded into the bore 25 and the locking nut 26 tightened.

When using a reflex type of camera, the operator looks into the interior of the focusing hood 1 and observes the image of the object in the regular manner. The photographer holds the grip 17 in one hand and has perfect control in aiming the camera at the object. The other hand is free for steadying the camera, or making any adjustments that may be required.

At the instant the picture is to be taken, the photographer depresses the plunger 10, which will actuate the shutter release 4, thus taking the picture. The same hand that grasps the handle C is used for operating the plunger. The speed of operation is so fast that a series of pictures can be taken in rapid succession by operating the film transport lever with the free hand when that type of a camera is employed. In any type of camera, the photographer does not have to fumble for the operating plunger before the picture is snapped when my device is attached to the camera. The photographer knows that the plunger is arranged on the handle in a position to be operated by the same hand that is grasping the handle, for instance, by the thumb.

My combined camera support and shutter release can be applied to movie cameras and will give perfect control over the latter during the taking of pictures.

While I have shown only the preferred form of my invention, it should be understood that various changes, or modifications, may be made within the scope of the annexed claim without departing from the spirit thereof.

I claim:

A combined camera support and shutter release comprising: a tubular handle; means for securing one end of the handle to a camera for shifting the latter in response to movements of the handle; the handle including a hand grasp extending beyond the camera; a cable release head disposed in the handle and having an operating plunger projecting from the handle; a cable release guided through the handle and having one of its ends connected to the release head, and its other end extending from the handle for attachment to a shutter release of a camera; the cable release head and the cable release having free rotation relative to the handle, whereby the cable release may be connected to or disconnected from the shutter release without kinking the cable release; and a retaining plate secured to the handle for removably holding the release head in the handle.

HERMAN RYDER.

REFERENCES CITED

The following references are of record in the file of this patent:

UNITED STATES PATENTS

| Number | Name | Date |
|---|---|---|
| 1,053,400 | Johnson | Feb. 18, 1913 |
| 1,621,903 | Rossiter | Mar. 22, 1927 |
| 1,805,185 | Ramsey | May 12, 1931 |
| 2,130,262 | Burlin | Sept. 13, 1938 |
| 2,275,644 | Olmstead | Mar. 10, 1942 |
| 2,358,777 | Rappleyea | Sept. 26, 1944 |